United States Patent Office 3,467,551
Patented Sept. 16, 1969

3,467,551
METHOD OF OPERATING FUEL CELL
Jose D. Giner, Sudbury, Mass., assignor, by mesne assignments, to Leesona Corporation, Cranston, R.I., a corporation of Massachusetts
Filed Sept. 30, 1965, Ser. No. 591,758
Int. Cl. H01m 27/12
U.S. Cl. 136—86        5 Claims

ABSTRACT OF THE DISCLOSURE

An electrochemical cell comprising an anode, a cathode, a fluid electrolyte chamber between said anode and cathode, and an electrically conductive metallic diaphragm is described. The metallic diaphragm is connected to one of said anode and cathode with or without employing an external power source to maintain the diaphragm at a fixed electrical potential to render the diaphragm passive. The diaphragm has a low electrical resistance and is stable to the corrosive environment of the cell.

---

This invention relates to an improved electrochemical device such as a fuel cell. More particularly, the invention relates to an electrochemical device comprising two electrodes and an electrolyte therebetween wherein the electrolyte compartment is separated into anodic and cathodic compartments by means of a conductive diaphragm which is maintained at a given potential. For convenience, the invention will be described hereinafter with emphasis being placed upon the application of the novel principle to a fuel cell. It will be apparent, however, that the inventive principle can be applied to other electrochemical devices, such as cells for the electrolysis of water and the like, where similar considerations apply.

The advantages of having a diaphragm separating the electrolyte compartment of a fuel cell into anodic and cathodic compartments are recognized. Thus, in fuel cells employing porous electrodes, it may be advantageous to have a diaphragm between the electrodes to prevent dissolved species passing from the cathode of the cell to the anode, or vice versa. Additionally, such diaphragms have been used to prevent the passage of unreacted fuel and oxidant from one electrode to the other. Diaphragms which have been suggested for aforesaid purposes include both non-conductive membranes and electronically conductive membranes. Electronically conductive membranes are particularly advantageous where non-conductive materials such as plastics, asbestos, fiber board, and the like are not chemically stable in the electrolyte. Moreover, it has been found that thin, porous metal diaphragms having very low electrolytic resistance have higher mechanical integrity than thin non-conductive diaphragms. Metal diaphragms have disadvantages, however, in that being electronically conductive they can conduct the current of the cell not only by ionic conductivity through the pores (or holes) of the membrane, but also by electronic conductivity through the bulk of the metal. The electronic conductivity is accompanied by anodic and cathodic reactions respectively at each of the faces of the diaphragm. The aforesaid electronic conductivity results in corrosion of the membrane with a corresponding efficiency loss for the fuel cell and evolution of gas which will clog the pores of the membrane, thereby increasing the resistance of the diaphragm. In view of the aforesaid disadvantages, metallic diaphragms have found only limited application in separating the electrolyte of electrolytic cells into anode and cathode compartments.

Accordingly, it is an object of the present invention to provide a fuel cell having a metallic diaphragm separating the electrolyte compartment of the cell into anodic and cathodic compartments which is not susceptible to corrosion and the consequent disadvantages.

The present invention circumvents the problems of the prior art by applying a fixed electrical potential to the metallic diaphragm separating the electrolyte compartment of the fuel cell into anodic and cathodic compartments. The potential selected will be one at which the diaphragm metal is thermo-dynamically stable, or at least passive, and at which no gas evolves or significant reaction occurs with the products present in the electrolyte. The potential can be fixed between one of the electrodes, i.e., the anode or cathode of the cell, and the metallic diaphragm by (1) using a resistor as a potential divider of the cell voltage between the main electrodes and the potential regulated for all load conditions by means of a slide contact on the resistor, or (2) by using an external power source. In the first of the aforesaid alternatives, a small fraction of the current applied to, or produced by, the electrochemical cell will be consumed in the resistor for fixing the potential of the diaphragm. In the second alternative, the current applied to, or produced by, the electrochemical device will not be influenced. The second expediency is most advantageous where the current flowing through the cell has to be interrupted and in instances where the potential of the diaphragm is higher or lower than the potential of both main electrodes.

In the accompanying drawing which forms a material part of this application, and wherein like numerals are employed to designate like parts throughout the specification:

Figures 1, 2:
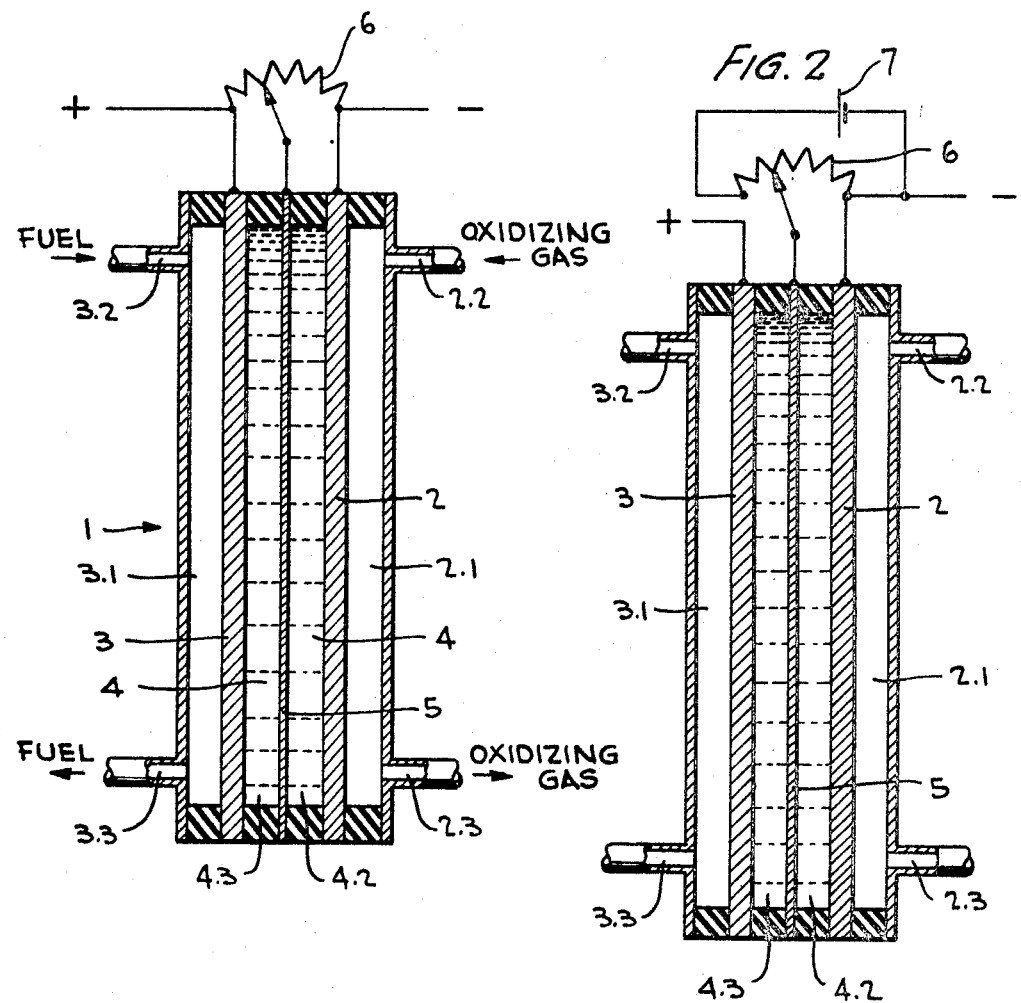
FIGURE 1 is a schematic view of a fuel cell wherein the metallic diaphragm is connected to the external electronic circuit joining the main electrodes by means of a slide contact.
FIGURE 2 is a schematic cross section of a fuel cell wherein the metallic diaphragm is connected to one electrode of the fuel cell and to an external power source.

More specifically, referring to FIGURE 1, fuel cell 1 comprises cathode 2, anode 3, and an aqueous electrolyte 4 between the electrodes. A fuel compartment 3.1 is positioned behind the fuel electrode having inlet means 3.2 and outlet means 3.3. An oxidant compartment 2.1 appears behind the cathode having inlet means 2.2 and outlet means 2.3. A porous metallic membrane 5 is positioned in electrolyte 4 separating the electrolyte chamber into anodic compartment 4.3 and the cathodic compartment 4.2. The diaphragm is electronically connected between anode 3 and cathode 2 with a resistor 6 by means of a slide contact. By adjusting the position of the slide contact the diaphragm can be maintained at any potential between the potential of the two electrodes.

The fuel cell of FIGURE 2 is constructed identical to the fuel cell of FIGURE 1, except the diaphragm is not connected to the main electrodes of the cell, but rather is connected to cathode 2 by means of an external power source 7. According to this expediency, the potential of the diaphragm can be maintained at a potential above, or lower than the potential of the main electrodes. Additionally, the current produced by the fuel cell is not effected.

According to the present invention, the material of the conductive diaphragm will depend to a substantial extent upon the electrolyte employed in the fuel cell and the over-all requirements of the cell. It is only essential that the metal which is used for the diaphragm is stable and passive over a certain potential range in the environment in which it is used. When an acid such as sulphuric or phosphoric acid is employed, suitable metals include the noble metals such as gold, silver, palladium, platinum, ruthenium, rhodium, and alloys thereof; and tantalum, zirconium, titanium, stainless steel, and iron. If an acid solution containing a chloride ion is employed, a silver diaphragm is especially desirable. In the event an alkaline electrolyte is selected, a diaphragm constructed of nickel is preferable. The proper potential at which the diaphragm is to be held can be determined from the thermodynamic corrosion potential and the passivation potential range of the metal. The current flowing will be determined by oxidation or reduction of impurities and/or by the corrosion current.

Having described the invention in general terms, the following examples are set forth to more particularly illustrate the invention.

Example 1

A fuel cell was constructed substantially similar to those shown schematically in the drawing employing a bi-porous lithiated nickel oxide cathode and a bi-porous cobalt activated nickel anode. The electrolyte of the cell was an 85 percent aqueous solution of potassium hydroxide. The cell temperature was maintained at 250° C. In operating the cell under the aforesaid conditions, corrosion occurs at the cathode causing the nickel of the electrode to go into solution as the nickelate. The soluble nickelate migrates to the anode of the cell and is reduced to metallic nickel. The metallic nickel in becoming attached to the anode forms dendrites which in time will short-circuit the cell, or will migrate to the cathode as a fine dispersion which is again oxidized and will eventually clog the pores of the cathode.

In the aforesaid cell, a nickel diaphragm was inserted in the electrolyte chamber separating the electrolyte into an anodic and cathodic compartment. A fixed potential of 400–500 millivolts against the hydrogen electrode was applied to the diaphragm by means of a resistor between the main electrodes of the cell and the potential adjusted by means of a slide contact. Under the aforesaid conditions, the corrosion products of the cathode were kept in the cathode compartment, with no dendrite formation occurring at the diaphragm (because of its potential) or on the anode. It was found that the described fuel cell gave enhanced results under identical cell conditions in comparison with a cell employing a diaphragm not having a fixed potential and over a cell not employing any diaphragm means.

Example 2

A fuel cell having a homoporous anode and bi-porous cathode is constructed and an 85 percent aqueous potassium hydroxide electrolyte positioned between the electrodes. The cell when fed with air as the oxidant and gaseous ammonia as the fuel was operated at 250° C. The efficiency of the cell is relatively low due to the mixing of unreacted ammonia and oxygen in the vicinity of the cathode.

To circumvent the aforesaid deficiency, a porous 5 mil thick nickel diaphragm is positioned in the electrolyte to separate the electrolyte chamber into an anodic and cathodic compartment. A potential of 400–500 millivolts against the hydrogen electrode is applied to the nickel diaphragm. The diaphragm under the fixed potential prevents the admixing of the ammonia fuel and oxidant, thereby increasing the efficiency of the cell. Although some ammonia is oxidized on the diaphragm causing some loss of cell efficiency, the amount is low due to the high polarization of the ammonia oxidation on nickel.

Example 3

A fuel cell is constructed employing a flat, homoporous anode and a bi-porous cathode. The fuel is ammonia dissolved directly in a 5 molar potassium hydroxide aqueous electrolyte with the cell being operated at 90° C. To avoid diffusion of the ammonia fuel to the cathode unreacted, a 0.5 mil platinum perforated foil is positioned in the electrolyte separating the electrolyte chamber into an anodic and cathodic compartment. The potential of the diaphragm is maintained at 1200 millivolts by means of an external power source connecting the cathode of the cell and the diaphragm, thereby maintaining the diaphragm passive.

It should be appreciated that the aforesaid examples are only set forth to provide working embodiments of the herein described invention. As will be apparent to one skilled in the art, the examples can be modified and still fall within the scope of the appended claims. Additionally, while the invention has been described with reference to a fuel cell, as will be further appreciated by one skilled in the art, the principles expressed herein can be applied to other electrochemical devices such as an electrolysis cell, which employs a pair of electrodes separated by an ion-conductive electrolyte. Such modifications are to be covered by the appended claims.

I claim:

1. The method of generating electrical energy in an electrochemical cell comprising an anode, a cathode, a fluid electrolyte chamber containing an electrolyte between said anode and cathode, and an electrically conductive metallic ion permeable diaphragm separating said electrolyte chamber into anodic and cathodic compartments comprising generating electrical energy in said electrochemical cell from a fuel and oxidant and during said generating step electrically regulating the electrical potential of said diaphragm to maintain an electrical potential sufficient to prevent contamination and/or dendritic growth on at least one of said anode and cathode.

2. The method of claim 1 wherein the electrolyte is a member of the group consisting of sulphuric and phosphoric acid and the diaphragm is a member of the group consisting of a noble metal, titanium, stainless steel, tantalum, zirconium and iron.

3. The method of claim 1 wherein the electrolyte contains chloride ions and the diaphragm is composed of silver.

4. The method of claim 1 wherein the electrolyte is an aqueous alkaline solution and the diaphragm is composed of nickel.

5. The method of claim 4 wherein the potential of the ion permeable membrane is maintained at about 400 to 500 millivolts measured against a standard hydrogen electrode.

References Cited

UNITED STATES PATENTS

| | | | |
|---|---|---|---|
| 2,901,523 | 8/1959 | Justi et al. | 136—86 |
| 2,969,315 | 1/1961 | Bacon | 136—86 X |
| 3,096,215 | 7/1963 | Voss et al. | |
| 3,098,802 | 7/1963 | Beer | 204—231 X |

FOREIGN PATENTS 171,090    5/1906    Germany.

ALLEN B. CURTIS, Primary Examiner

U.S. Cl. X.R.

204—231